(12) United States Patent
Harrup et al.

(10) Patent No.: US 6,576,335 B2
(45) Date of Patent: Jun. 10, 2003

(54) SOLID-PHASE MATERIALS FOR CHELATING METAL IONS AND METHODS OF MAKING AND USING SAME

(75) Inventors: Mason K. Harrup, Idaho Falls, ID (US); John E. Wey, Idaho Falls, ID (US); Eric S. Peterson, Idaho Falls, ID (US)

(73) Assignee: Bechtel BWXT Idaho, LLC, Idaho Falls, ID (US)

( * ) Notice: Subject to any disclaimer, the term of this patent is extended or adjusted under 35 U.S.C. 154(b) by 65 days.

(21) Appl. No.: 09/745,024

(22) Filed: Dec. 20, 2000

(65) Prior Publication Data

US 2002/0114961 A1 Aug. 22, 2002

(51) Int. Cl.$^7$ ............................................... B32B 19/04
(52) U.S. Cl. ..................... 428/325; 428/688; 428/454; 428/448
(58) Field of Search ................. 428/323, 325, 428/688, 689, 454; 210/661, 679, 681, 682, 689

(56) References Cited

U.S. PATENT DOCUMENTS

| | | | |
|---|---|---|---|
| 4,379,931 A | 4/1983 | Plueddemann | 546/14 |
| 5,017,540 A | 5/1991 | Sandoval et al. | 502/158 |
| 5,240,602 A | 8/1993 | Hammen | 210/198.2 |
| 5,695,882 A | 12/1997 | Rosenberg | 428/405 |
| 5,817,239 A * | 10/1998 | Tavlarides et al. | 210/661 |
| 6,107,523 A * | 8/2000 | Virnig et al. | 568/412 |
| 6,210,078 B1 * | 4/2001 | Redwine et al. | 405/263 |
| 6,350,354 B1 * | 2/2002 | Neuman et al. | 204/233 |

* cited by examiner

*Primary Examiner*—Robert Dawson
*Assistant Examiner*—Christopher M. Keehan
(74) *Attorney, Agent, or Firm*—Pedersen & Company PLLC

(57) ABSTRACT

A solid material for recovering metal ions from aqueous streams, and methods of making and using the solid material, are disclosed. The solid material is made by covalently bonding a chelating agent to a silica-based solid, or in-situ condensing ceramic precursors along with the chelating agent to accomplish the covalent bonding. The chelating agent preferably comprises a oxime type chelating head, preferably a salicylaldoxime-type molecule, with an organic tail covalently bonded to the head. The hydrocarbon tail includes a carbon-carbon double bond, which is instrumental in the step of covalently bonding the tail to the silica-based solid or the in-situ condensation. The invented solid material may be contacted directly with aqueous streams containing metal ions, and is selective to ions such as copper (II) even in the presence of such ions as iron (III) and other materials that are present in earthen materials. The solid material with high selectivity to copper may be used to recover copper from mining and plating industry streams, to replace the costly and toxic solvent extraction steps of conventional copper processing.

16 Claims, 12 Drawing Sheets

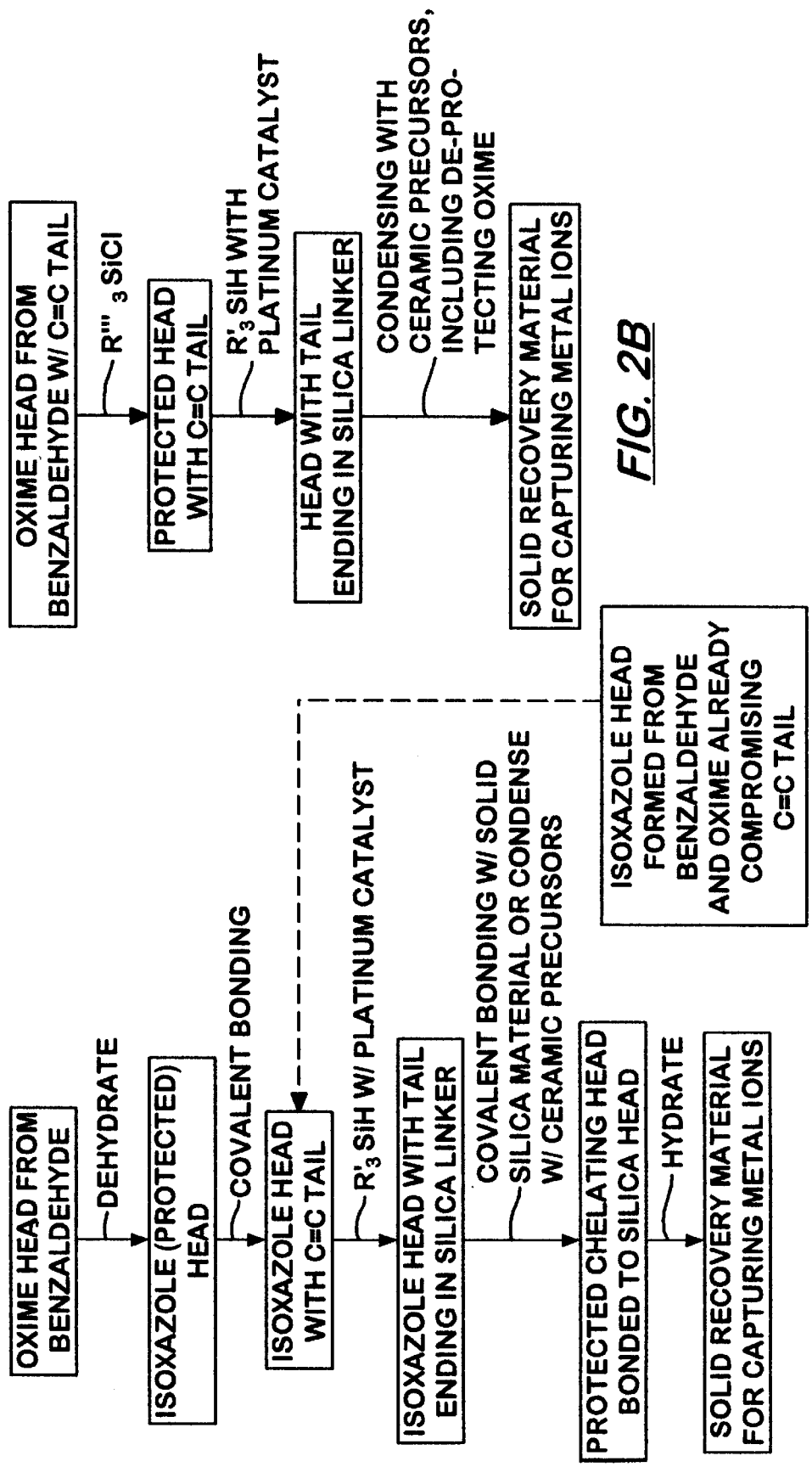

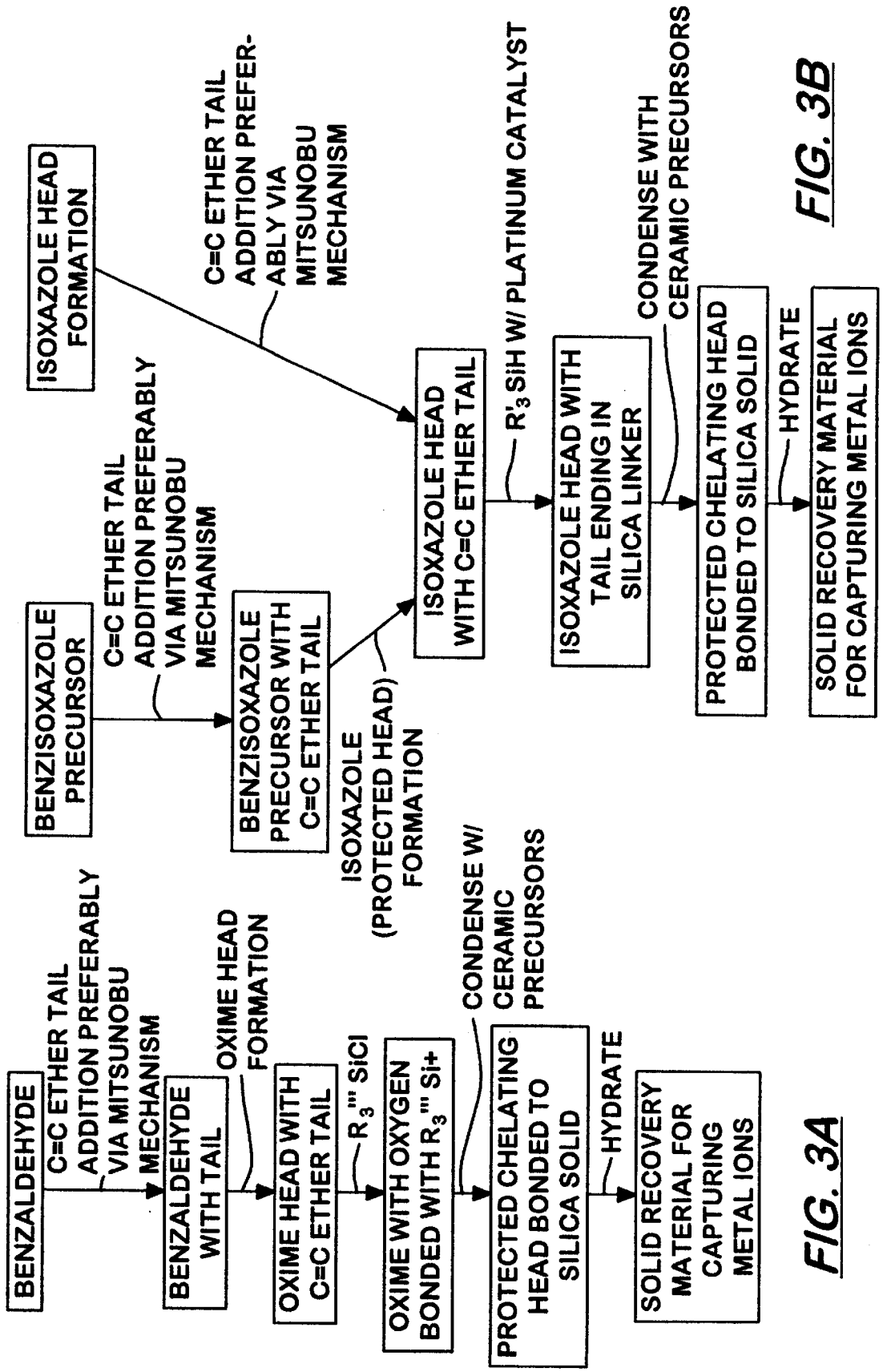

R = H, ALKYL
n = 1 TO 16
R' = Cl, ALKOXY

R = H, ALKYL
n = 1 TO 16
R' = Cl, ALKOXY
X = Cl, Br, I

R = H, ALKYL, ARYL
n = 1 TO 16

R = H, ALKYL, ARYL
n = 1 TO 16

ID13727 awarded by the United
SOLID-PHASE MATERIALS FOR CHELATING METAL IONS AND METHODS OF MAKING AND USING SAME

CONTRACTUAL ORIGIN OF THE INVENTION

This invention was made with United States Government support under Contract No. DE-AC07-94ID13223, now Contract No. DE-AC07-99ID13727 awarded by the United States Department of Energy. The United States Government has certain rights in the invention.

BACKGROUND OF THE INVENTION

1. Field of the Invention

The present invention relates to materials and methods for selectively recovering metal ions, such as copper, from aqueous streams. More specifically, the invention relates to producing high yields of high purity solid metal-ion-capturing material, by covalently binding a chelating moiety to a solid-phase material. The invention is particularly beneficial for recovering copper from aqueous solutions in the copper mining and copper plating industries, because the solid-phase material is selective to copper in the presence of iron and other metals, and results in energy and material savings compared to conventional copper recovery methods.

2. Related Art

Copper chelating moieties have been used in the past for removing copper from aqueous streams in the copper mining industry. Liquid phase chelates in aqueous-immiscible organic solvents are employed in liquid-liquid phase extraction processes to remove copper from the mining product or waste streams. After the aqueous stream is separated from the solvent stream, the solvent containing the chelated copper is then back-extracted with strong acid in order to remove the copper, and the copper is typically recovered by electro-winning. This solvent extraction/electro-winning (SX/EW) process requires large amounts of flammable and toxic solvent, and large amounts of time and energy. This SX/EW process also requires periodic addition of chelating agent due to losses in the process. One chelating agent used in the conventional SX/EW process is a liquid-phase salicylaldoxime copper capturing moiety.

Other methods of metal ion recovery using salicylaldoxime has been studied and described in the literature. Sarkar et al., in "Sorption recovery of metal ions using silica gel modified with salicylaldoxime," *Talanta*, 42 (1996) pp.1857–1863, describes sorbent materials for metal ions, wherein the sorbent material consists of salicylaldoxime physically adsorbed onto solid phase materials. The Sarkar et al. sorbent synthesis is reported as: 1) refluxing silica gel with 6 M HCl for about 3 hours to remove any contaminating metals such as iron; 2) washing the silica gel with deionized water and drying it under reduced pressure at 150° C.; 3) refluxing the dried silica gel with salicylaldoxime in ethanol (10% w/w) at 70–80° C. for four hours; and 4) filtering and drying under vacuum to obtain the solid sorbent. Sarkar, et al. reports that IR spectrum of the resulting sorbent shows IR peaks coinciding with peaks of salicylaldoxime itself, suggesting that the sorbent synthesis techniques resulted in the salicylaldoxime being retained within the sorbent as such, without any structural change. Consistent with this finding was that ethanol easily removed all the salicylaldoxime from the sorbent when ethanol was passed over the sorbent. These findings were consistent with the salicylaldoxime being physically adsorbed in the Sarkar et al sorbent, rather than being chemically/covalently bonded to the solid material.

In Hammen, U.S. Pat. No. 5,240,602, chromatographic materials have been described that include a silica-based solid support, an affinity ligand, and a polymeric non-ionic, hydrophilic spacer with a coupling group connecting the affinity ligand to the support. These affinity materials use preferential dissolution to create a chromatographic effect, in which the materials of interest are preferentially, but only temporarily, attracted by the affinity materials. These affinity materials do not chelate materials of interest, and do not capture the materials of interest in any way that requires regeneration of the affinity materials. Therefore, the affinity materials do not provide a way to remove metal ions from a stream. Hammen uses polymers as a spacer between the silica-based solid support and the affinity ligand, including PEG, PVA, PPG, polyethylene dithiol, and polymers of glycine, serine, or threonine. The Hammen polymer is attached to the solid support by a substitution mechanism. Hammen discloses nitrogen-based linkages between the affinity ligand and the solid support, which linkages may be appropriate for a chromatographic use but which would be low in selectivity and prone to degradation in other uses.

What is still needed is a solid-phase metal ion capturing material that is durable, highly selective to the desired metals, and acid/base stable, so that it is appropriate for large-scale metal recovery, regeneration, and re-use. Economical copper-recovery materials and methods are still needed that do not require hazardous and toxic flammable solvents, complex and costly process plant equipment, and high-energy-consumption process steps. What are needed are such materials and methods that lower the cost per pound of recovered copper metal in copper mining and plating industries, and that do so with lowered environmental impact compared to conventional technologies.

SUMMARY OF THE INVENTION

The present invention comprises a solid-phase metal ion recovery material including a metal ion capturing agent chemically bound to a solid support, and methods for making the recovery material. The invention further comprises methods of recovering metal ions from aqueous streams, such as mining or metal plating product and waste streams, by direct contact between the aqueous stream and the solid-phase recovery material. The invented materials and methods may eliminate the use of liquid-liquid extraction processes and large volumes of organic solvents conventionally used in metal ion recovery in the mining and plating industries. Metal ion recovery materials according to the invention preferably comprise chelating heads covalently bound to ceramics or ceramic precursors via non-polymeric tethers. The chelating head may be any known chelating ligand, for capturing copper, zinc, uranium, plutonium, or other materials. The tether is an organic compound covalently attached to the chelating head and functionalized by a linker that attaches to an olefin portion of the organic compound. The linker is chosen to be appropriate for the selected solid support, for example, a silica linker for use with silica solids, a titania linker for use with titania solids, an alumina linker for use with alumina solids, etc. Several preferred recovery materials are highly selective for copper (II) in the presence of iron (III) and many other materials that are typically present in the digested earth materials of a conventional copper mining operation. Also, several preferred recovery materials are highly selective for copper in the presence of the materials that are present in a commercial metal plating stream.

The invented metal ion recovery material includes an organic metal-capturing compound, hereafter also called "capturing compound," or "capturing agent," that is covalently linked to a solid support. Covalent linkage may include, for example, covalent binding directly to the surface of a silica-based solid. Also, covalent linkage may include condensation of silica-based ceramic precursors into a solid, some to all of which precursors are associated with capturing agent prior to the condensation and/or some to all of which precursors become associated with capturing agent during the condensation.

The metal-capturing compound comprises a chelating moiety or chelating "head" covalently bound to a "tail" or "tether" that covalently binds the chelating head to the surface of the solid support, for example, via a silica linker if the solid support is a silica-based material. Thus, the entire linkage between the chelating head and the solid support is chemical, rather than physical, and so is very durable. In addition, the preferred synthesis routes result in the invented metal ion recovery material being acid/base stable.

The chelating head may be any of a variety of chelating heads, which captures and chelates with the material of interest, preferably a metal ion. "Capturing" herein means irreversible binding under the existing conditions (pH, temperature, etc.) of the feed stream. Release of the captured metal ions may be effected by a second step wherein the new conditions are significantly altered in some fashion as to cause metal ion release, for example, removal of the solid recovery material from the feed stream followed by acid stripping. "Chelating," as known by those of skill in the art, means "multiple ionic bonds to a single metal center." A preferred, but not the only, chelating head is an oxime molecule, for example, a salicylaldoxime-type molecule, 2-hydroxy benzophenone oximes, and/or 2-hydroxy acetophenone oximes. Or, other chelating moieties such as substituted 8-hydroxy quinolines may be used. By "oxime," the inventors mean a molecule comprising the group "CH (:NOH). By "salicylaldoxime-type" molecule, the inventors mean molecules including "$C_6H_4(OH)CH(:NOH)$," including substituted salicylaldoximes, in which one or more of the cyclic hydrogens may be substituted with other molecules such as OH, F, $NH_2$, $NR_1R_2$, SH, or SR, wherein R, $R_1$, and $R_2$ in this list may be alkyl or aryl, for example.

The "tether" comprises an organic portion that includes a carbon-carbon double bond prior to its covalent bonding with the solid support. Preferably, the tether ends in an alpha olefin, and, optionally, may contain other unsaturations. The inventors envision that pure alkyl tails will be desirable in some cases, for example, where a hydrophobic capturing agent is desired. The preferred tether is a single, straight chain ether moiety, for example, comprising an ethylene oxy unit. The inventors believe tether compounds from 1 carbon to about 25 carbons will be most effective, with chains of about 3–25 preferred because the chelating heads attached to such chains will be distanced from the silica far enough to be reached by the metal ions.

To link the "head and tether" combination to a solid, the combination must have a linker at the end of the tether, which renders the entire molecule as a "functionalized capturing agent" (FCA), that is, head plus functionalized tail. For example, a silica linker may be used, such as $R'_3Si$ wherein R' is Cl or alkoxy. The silica linker attacks the alpha olefin of the tether, to bind the silicon center to the tether via hydrosililation, forming the FCA. Once the FCA is formed, it may be covalently bound to a solid in two approaches for producing an FCA-functionalized solid.

The first approach for producing an FCA-functionalized solid is hydrolysis in the presence of a pre-formed solid, that is, an existing solid that is provided or formed in processes separate from any process involving the FCA, for example, a ceramic condensed previously to any introduction of FCA. This approach results in a modified ceramic solid, that is, a (pre-formed) solid functionalized by the capturing agent extending out from the solid to distance the chelating head from the solid.

The second approach of producing an FCA-functionalized solid is hydrolysis in the presence of no solid, but, instead, in the presence of solid precursors such as tetraethylorthosilicate (TEOS). This approach forms modified ceramic precursors that condense to form the modified solid. In this second approach, solids are formed and FCA is attached in the same process.

Thus, in the first of the methods described above, the FCA is condensed onto the surface of an already-existing, already-formed silica-based solid support, and the solid may be in various forms. In one embodiment of such a method, the final step of synthesis is done in a slurry containing the silica particles, so that the capturing agent condenses onto silica particles to form a granular recovery material. In another embodiment of such a method, the final step is done by condensing the capturing agent onto existing glass or ceramic objects other than granules, resulting in a surface-modified structure. These silica-particle-based or glass/ceramic-based capturing materials may be used for many applications, for example, the copper recovery process discussed herein, or other selective removal applications.

In the second of the methods described, silica-based ceramic precursors are condensed in situ with FCA, that is, the pre-formed FCA are present and covalently binding with the precursors during the condensation process. In such a method, the FCA may be mixed with a single ceramic precursor such as tetraethylorthosilicate (TEOS), or other precursors, or mixtures of precursors. The mixture of capturing agents and ceramic precursors may be hydrolyzed producing water and ethanol, thereby performing a "sol-gel" type of process. The material resulting from this sol-gel process may be referred to as a "xerogel" and is a silica matrix containing the covalently-bound metal ion chelating molecule ("head") distanced from the solid by the tether. Included the sol-gel process are in-situ reactions in which FCA covalently binds to a ceramic precursor, followed by condensation of a plurality of precursors into a solid, and also in-situ reactions in which ceramic precursors condense together followed by covalent binding of FCA to the condensed solid.

By careful control and customizing of the sol-gel condensation process, for example, by varying the ratio of ceramic precursor to capturing agent, the size and physical properties of the resulting solid particles can be controlled with a high degree of specificity, allowing custom-sized and custom-made modified solids. The inventors believe the FCA will direct the self-assembly/condensation process so that the chelating head remains accessible to the bulk solvent. The condensation process is believed to yield a high capacity metal ion recovery material due to the chelating heads in the final recovery material being substantially exposed. This creates a high surface area material with high chelating site coverage of the ceramic, for an active and high capacity metal recovery material. These condensed ceramic recovery materials may be used for many applications, for example, the copper recovery process discussed herein, or other selective removal applications.

The preferred methods of manufacture include several features that stream-line the synthesis and that produce highly selective and durable solid materials. Protection and de-protection of the chelating head may be necessary, and may include, for example, manipulation of the dehydration equilibrium between an oxime and its corresponding benzisoxazole. Acidic hydration may be used to de-protect the head to the oxime form. This hydration preferably takes place during use of the recovery material, in the acidic environment of the metal ion aqueous feedstream. The process environment is sufficient to de-protect the isoxazole by driving the hydrodynamic equilibrium process toward ring-opening. This strategy protects the oxime site without additional synthetic transformations, such as typical protection/de-protection of reactive intermediates. The role of this hydration/dehydration equilibrium may be seen in various of the example synthesis schemes below.

Another feature of the invention is that the preferred synthesis steps do not include nitrogen-containing linking groups, which are known to chelate undesired metal cations, such as iron (III), and which lead to lowered selectivity of recovery of the desired metals, that is, typically, lowered copper/iron selectivity. The preferred covalently bonded "tether" between the chelating oxime head group to the silica particle solid support provides a more durable material than chelates that are ionically coordinated or simply physisorbed to a surface of a support. Also, the covalently bonded tether system of the invention offers advantages in cost, durability and efficacy over polymer supports, such as polyamines, that have been suggested. Further, the preferred synthesis routes lead to recovery materials that are stable to any solution with a pH less about 12–13, the pH range above which the silica support would dissolve. The preferred pH operating range is ≦8 pH, at which pH range copper chelation is strong.

Preferred synthesis routes for creating the functionalized capturing agents and the solid metal recovery materials resulting therefrom are illustrated in three classes: Rearrangement, Ether Addition, and Mitsunobu coupling, with etheric linkage methods, via Mitsunobu coupling or other methods, being the especially-preferred methods. Numerous methods for forming an ether-linkage, such as CDD coupling, etc., are described in the chemical literature. See, for example, March, J., "Advanced Organic synthesis, 4$^{th}$ Edition," J. Wiley/Interscience, N.Y., N.Y., 1994, Part 2.

Some of the methods within the Rearrangement, Ether Addition and Mitsunobu coupling categories are summarized as follows:

1) Rearrange a benzaldehyde molecule substituted with an ether tail having an alpha olefin end, and react the resulting compound in basic environment to form an allyl-hydroxy-benzaldoxime;
    protect oxime head by dehydration;
    add silica-linker to alpha-olefin end of allyl tail;
    covalently attach silica- to silica-based solid; and
    de-protect chelating head by hydration in acidic environment.
2) Various Ether Addition Routes:
    a) Synthesize salicylaldoxime from benzaldehyde;
        protect oxime head by de-hydration to an isoxazole;
        add ether tail by substitution at OH group;
        add silica-linker to alpha-olefin end of ether tail;
        covalent attachment of silica-linker to silica-based solid;
        de-protect chelating head by hydration in an acidic environment.
    b) Add ether tail to benzaldehyde via tosylate mechanism;
        form benzaldoxime head;
        protect oxime head by substituting with —Si R"$_3$, wherein R" may be alkyl, t-butyl,
        perfluoroalkyl, or phenyl;
        add silica-linker to alpha-olefin end of ether tail;
        condense with ceramic precursors, de-protecting chelating head.
    c) Add ether tail to benzaldehyde via tosylate mechanism;
        form benzisoxazole head;
        add silica-linker to alpha-olefin end of ether tail;
        condense with ceramic precursors;
        de-protect chelating head by hydration in an acidic environment.
3) a) Add ether tail with alpha-olefin end to benzaldehyde via Mitsunobu ether
        addition (using diethyl azodicarboxylate and tri-phenyl phosphorous);
        form oxime head;
        protect oxime head by substituting with —SiR"$_3$;
        add silica-linker to alpha-olefin end of ether tail;
        condense with ceramic precursors, de-protecting chelating head.
    b) Double carbon-carbon bond-containing ether tail addition to a benzisoxazole precursor, such as salicyl aldehyde, followed by isoxazole head formation; or
    c) Double carbon-carbon bond-containing ether tail to an isoxazole head;
        via Mitsunobu ether addition, followed by:
        silica-linker addition to alpha-olefin end of tail;
        condensation with ceramic precursors; and
        hydration to de-protect chelating head.

The invented materials and methods selectively recover metal ions without the need for organic solvents, without the need for chelating agent makeup, and without the large energy consumption and process complexity of prior art materials and methods. In copper recovery, for example, the copper-containing waste or product stream is applied directly to the invented solid recovery material, thus, bypassing the prior art liquid-liquid extraction step. The copper is then removed from the solid recovery material, to obtain the copper and to regenerate the solid recovery material, preferably by means of an acid strip step or "acid wash," which may be similar to that done in conventional copper recovery processes that do not use solid recovery materials. Because the copper chelating agent is covalently bound to the silica solid, there is little, if any, loss of copper extraction capability over time. By reducing or eliminating organic solvents and chelating agent loss, copper recovery may be accomplished at a lower cost per pound of recovered copper metal. Also, the invented heterogeneous process, which contacts the metal-ion containing aqueous stream with a solid recovery material, reduces adverse environmental impact because of the reduced use and consumption of chemicals and reduced energy consumption.

BRIEF DESCRIPTION OF THE DRAWINGS

FIG. 2A illustrates a generalized scheme for ether addition synthesis, according to the invention, of a solid metal ion recovery material, using dehydration and hydration for protecting and de-protecting, respectively, the chelating head during the synthesis.

FIG. 2B illustrates another generalized method, according to the invention, for ether addition synthesis of a solid metal ion recovery material, using R"$_3$Si+ addition and removal for protecting and de-protecting, respectively, the chelating head during the synthesis, and featuring silica linker addition followed by in-situ condensation of the chelating agent with ceramic precursors to form the solid recovery material.

FIG. 2C is a detail showing an alternative method of isoxazole head synthesis that may be used in the embodiments of FIG. 2A.

FIG. 3A and 3B illustrate generalized methods, according to the invention, for synthesizing a solid metal ion recovery material, preferably utilizing diethyl azodicarboxylate and Ph$_3$P ("Mitsunobu") mechanisms.

DESCRIPTION OF THE INVENTION

Referred to the Figures, there are shown several embodiments of the invented material for metal recovery from liquid streams, and several methods for synthesizing the invented materials.

Figure 1A:
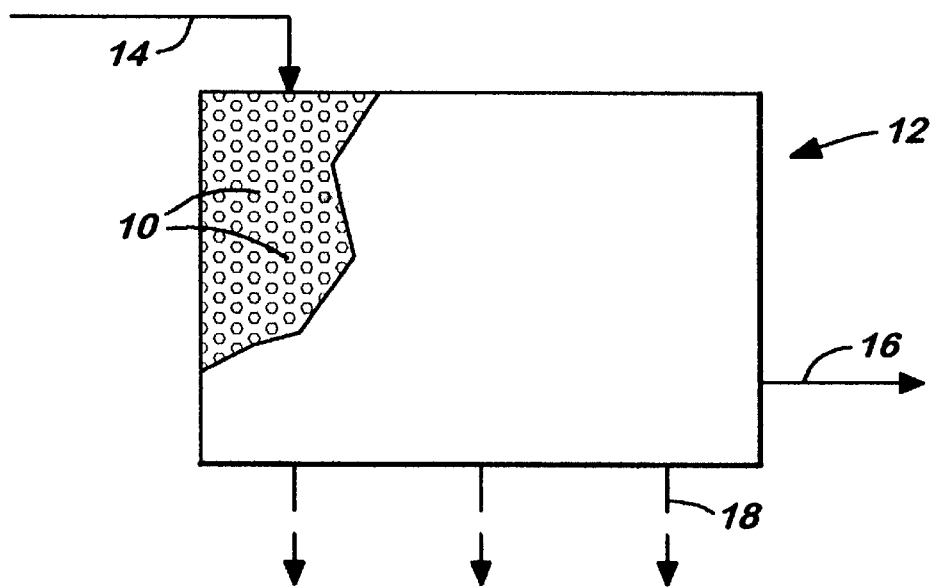
FIG. 1A schematically depicts a batch or continuous process for removing copper from an aqueous stream using a particulate/granular solid recovery material according to one embodiment of the invention.

FIG. 1A schematically illustrates a solid metal ion recovery material in the form of granules/particulate 10 made according to the instant invention for use in a metal ion recovery process 12, for example, wherein copper (II) is recovered from an mining effluent aqueous stream 14 containing other ions (III) such as iron. The copper-containing stream 14 is contacted with or passed over the granules 10 is either batch or continuous processing, with an aqueous stream substantially minus copper 16 being easily separated from the solid recovery material by conventional methods. At an appropriate time on-stream, depending on the capacity of the solid recovery material, the spent granules 18 are withdrawn from the process for regeneration, or regenerated in-situ, preferably by an acid wash process.

Figure 1B:
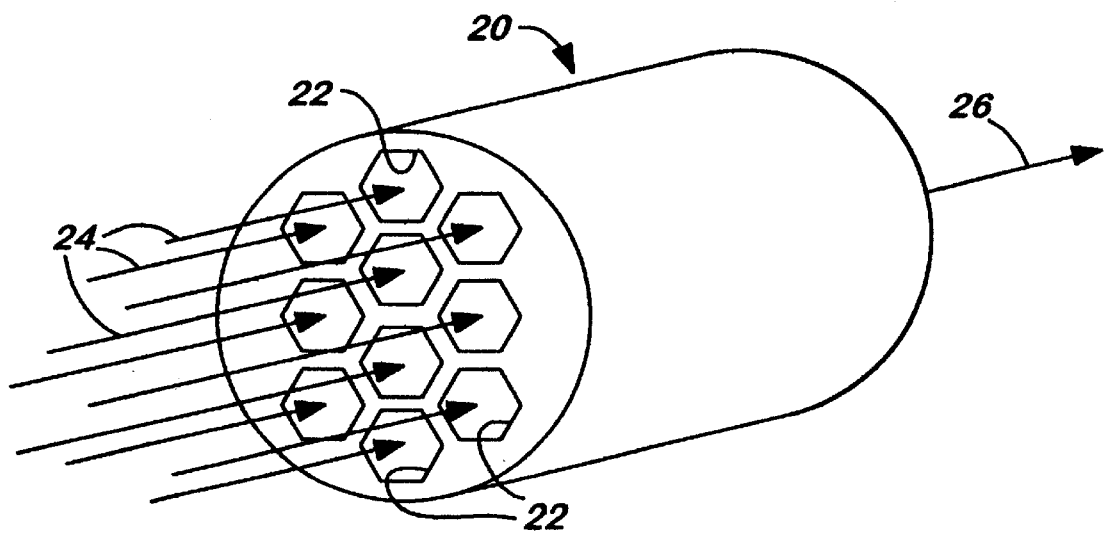
FIG. 1B schematically depicts a process for removing copper from an aqueous stream using a solid ceramic or glass object having an exposed surface with covalently-bonded chelating agent according to another embodiment of the invention.

FIG. 1B schematically illustrates a solid metal ion recovery material in the form of a high surface area polygonal surface ceramic 20 made according to the instant invention. In such a ceramic object 20, the capturing agent is attached to the ceramic surface 22 by its tail, so that the chelating head of the agent is accessible to the aqueous stream 24 containing copper metal ions. The stream 24 passes through ceramic 20, so that the copper is permanently captured and retained on the ceramic 20, until a subsequent stripping of removal process. After passing through the ceramic, the effluent stream 26 is substantially minus copper. The ceramic 20 may be taken off-stream and regenerated via acid wash.

While embodiments of the invention are illustrated herein that are particularly beneficial in copper industries, many other embodiments of the invented materials and methods may be applied to various industries requiring metal ion recovery. Embodiments for these various industries may be designed, for example, by selecting various ceramic solids or precursors and linkers appropriate for the solids or precursors, by selecting various tethers, and by selecting various chelating heads. Once this disclosure of the present invention is made available to a person of average skill in the art, he/she will be able to apply the invented methods and materials to custom-make materials for various industries.

Examples of routes for synthesizing materials according to the invention are described in the Figures and this Description and are organized as follows: 1) Rearrangement Routes (for example, FIG. 4); 2) Ether Addition Routes; and 3) Mitsunobu coupling routes.

FIGS. 2A–2C and 3A and 3B illustrate the ether addition routes and the especially-preferred Mitsunobu routes according to the invention, and FIGS. 5–10 illustrate these routes in more detail. The Mitsunobu routes, or other etheric-linkage formation routes are especially-preferred, because they are easy to carry out and give high yields of the desired solid material.

Figure 4:
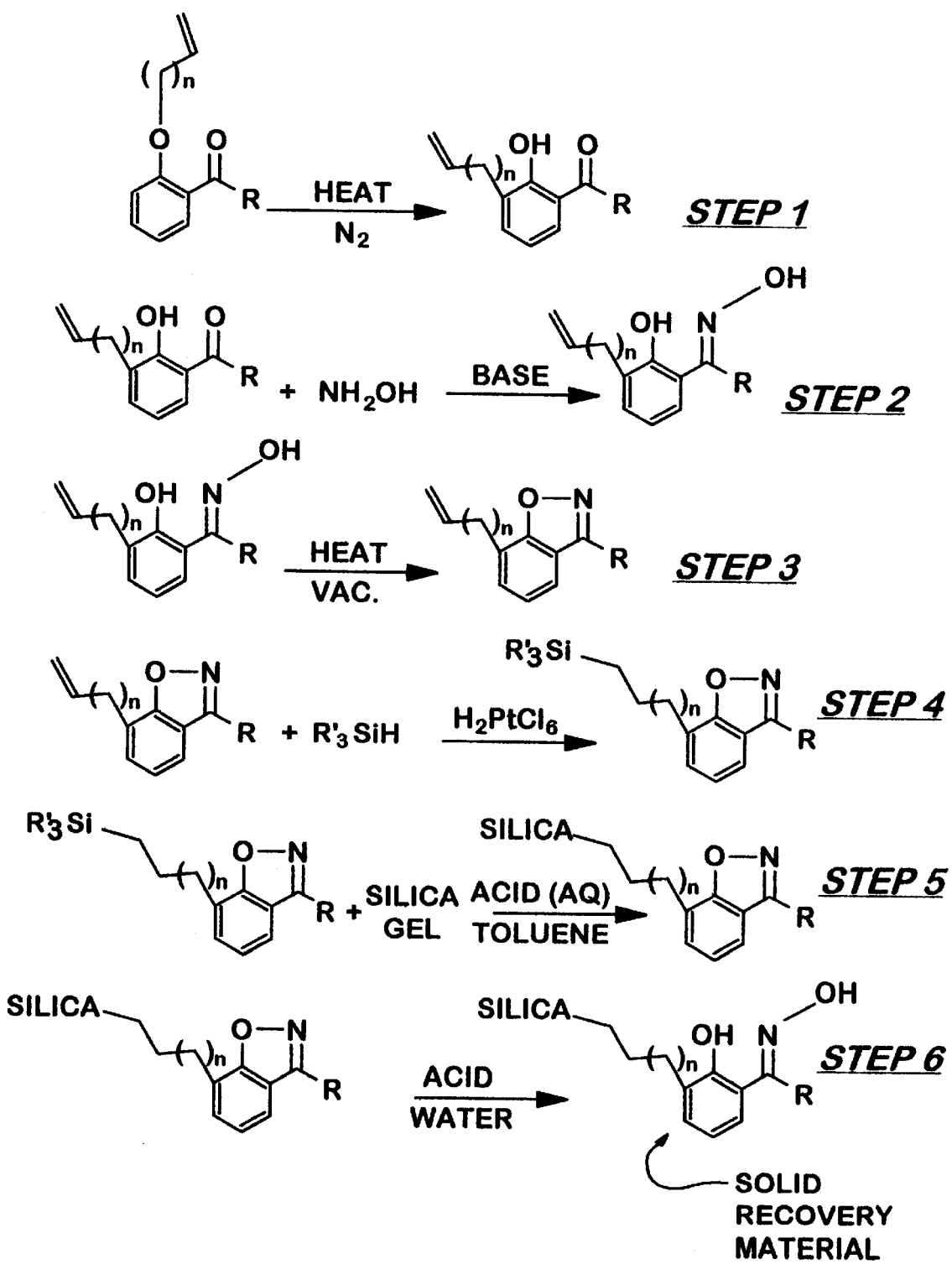
FIG. 4 is a schematic of one rearrangement method of making a solid recovery material according to the invention.

One embodiment of a "rearrangement route" to a copper-chelating recovery material according to the invention is shown in FIG. 4. Step 1 starts with a benzaldehyde molecule substituted with a carbon-carbon double bond ether hydrocarbon tail at the 2 position. Step 1 rearranges this molecule, under heat and nitrogen conditions, to create a compound with a tail at the 3 position, wherein the tail is still an alpha olefin. Step 2 replaces oxygen of the RC(:O) group with (:NOH), to create, for example, 3-allyl-2-hydroxy-benzaldoxime. Step 3 dehydrates the chelating site RC(:NOH) to form an isoxazole group, which, in effect, "protects" the chelating site during subsequent steps. Step 4 attaches a silica linking agent to produce the functionalized chelating agent, for example, isoxazole triethoxysilyl, by reaction of the Step 3 product with triethoxysilane in the presence of a platinum chloride catalyst. Step 5 attaches the functionalized chelating agent to silica gel particulate, by condensing the chelating agent onto the particulate in an aqueous acidic environment in the presence of toluene. Step 6 is a final step, "activating" or "de-protecting" the chelating head by dehydration in an aqueous acidic environment. This "deprotecting" step exposes the chelating site "RC(:NOH)" so that it is available for capturing metal ions from an aqueous stream. Step 6 results in a solid recovery material according to one embodiment of the invention, and may be accomplished in use in the acidic environment of metal-ion containing aqueous streams.

Figure 5:
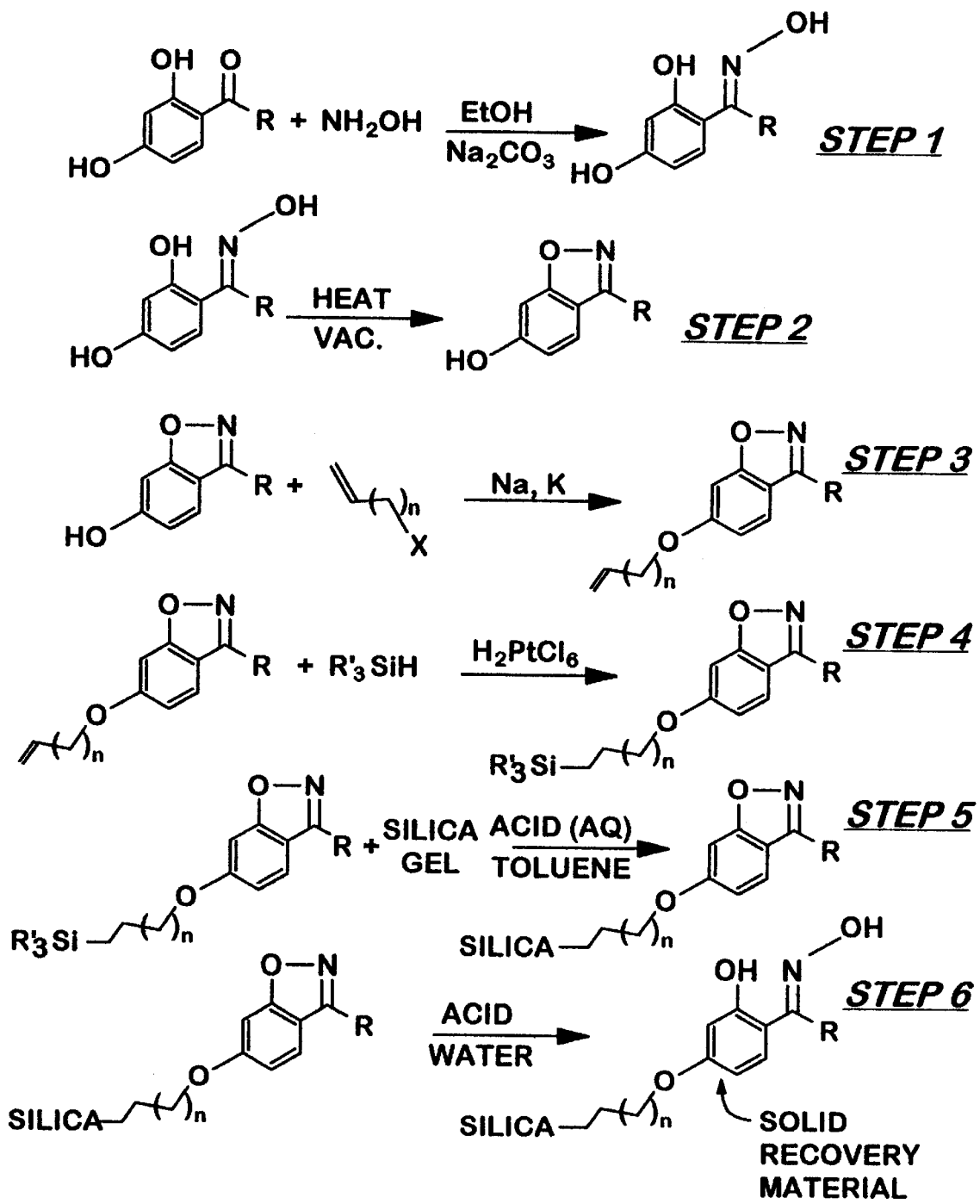
FIG. 5 is a schematic of an ether addition method of making a solid recovery material according to the invention, in the class of synthesis methods of FIG. 2A.

FIG. 5 illustrates an "ether addition route" for synthesizing a solid recovery material according to another embodiment of the invention. The FIG. 5 synthesis adds an ether hydrocarbon tail to a "protected" salicylaldoxime chelating head (i.e., the benzisoxazole head). Step 1 synthesizes salicylaldoxime from 2,4-dihydroxybenzaldehyde. Step 2 dehydrates the salicylaldoxime under heat and vacuum, to "protect" the chelating site by forming 5-hydroxy-1,2-benzisoxazole. Step 3 adds $H_2C\!=\!CH(CH_2)_nX$, wherein X is Cl, Br, or I, to create the carbon-carbon double bond ether tail, in this case, at the 4 position on the ring. Step 4 attaches a silica linking agent, for example, triethoxysilane or other $R'_3SiH$ compound, in the presence of a platinum chloride catalyst, producing the functionalized chelating agent, wherein R' may be Cl or alkoxy. Steps 5 and 6 follow the general approach of Steps 5 and 6 in the synthesis in FIG. 4, but with the tail at the 4 position rather than the 3 position. While the synthesis of FIG. 5 illustrates a case in which the second hydroxy group on the salicylaldoxime ring is in the 4 position, synthesis according to the invention may include other variations, for example, wherein the hydroxy groups in the 3, 5, or 6 positions. The acidic environment of Step 6 may be, for example, the acidic aqueous environment of a copper recovery process using the solid recovery material according to this embodiment of the invention.

Figure 6:
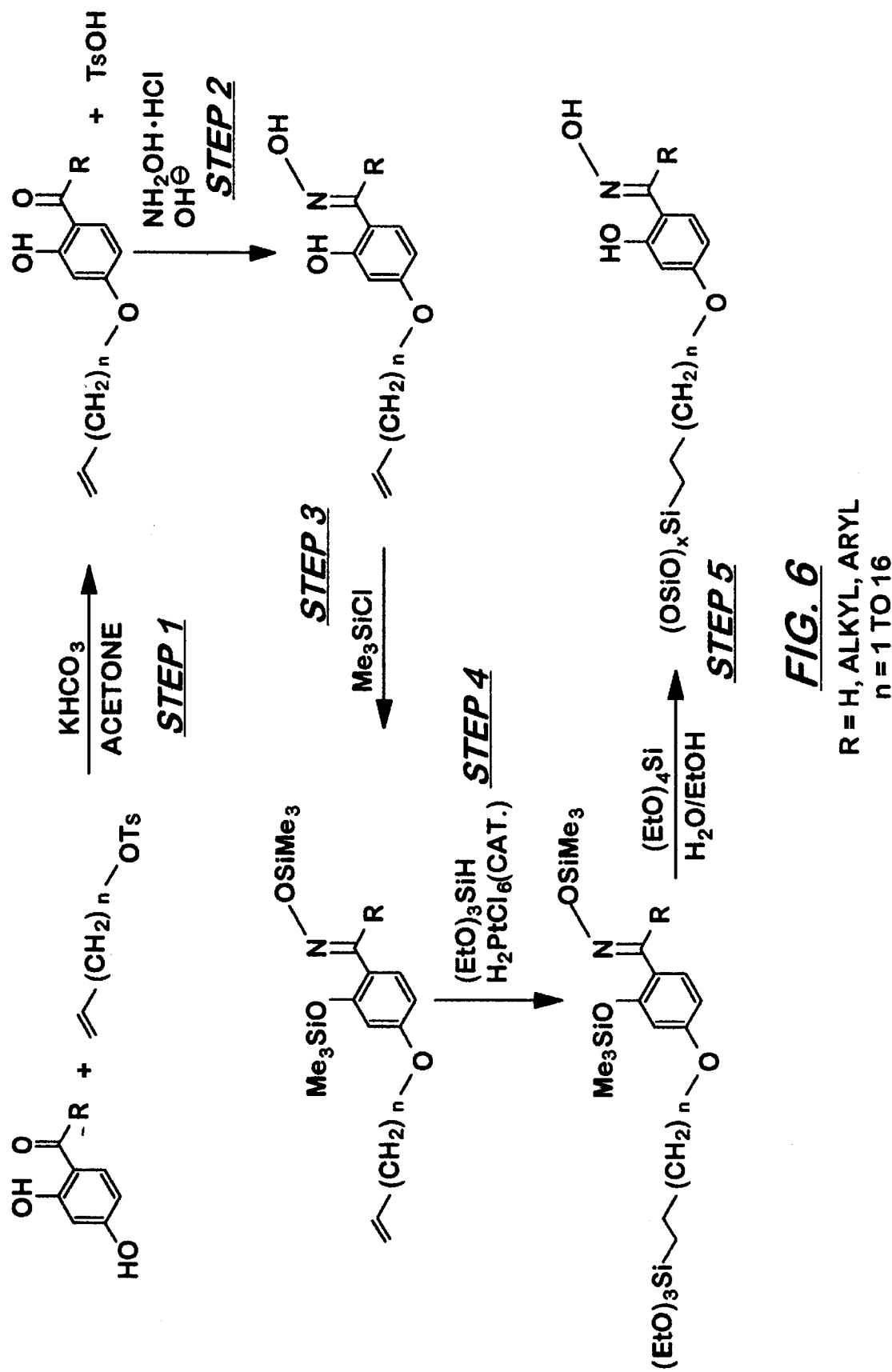
FIG. 6 is a schematic of another method of making a solid recovery material according to the invention, in the class of synthesis methods of FIG. 2B.

FIG. 6 illustrates an ether addition route that also may be called the "Oxime Route." In this synthesis route, Step 1 reacts 2,4-dihydroxybenzaldehyde with $CH_2CH(CH_2)_nOTs$ (for example, 1-undecylenyltosylate) in the presence of potassium carbonate and acetone, to form an ether-substituted benzaldehyde molecule, wherein the alpha-olefin ether tail is at the 4-position on the ring, plus tosylic acid (p-toluene sulfonic acid). Step 2 replaces oxygen of the RC(:O) group with (:NOH), to create, for example, 3-alpha-olefin-ether-2-hydroxy-benzaldoxime. In Step 3, $(OSiMe_3)$ is substituted in place of (OH) on the benzaldoxime unit to protect the oxime site during subsequent steps. In Step 4, the silica-linking agent, $(EtO)_3Si$, is added, in the presence of a platinum chloride catalyst, to obtain the functionalized capturing agent. Step 5 mixes the functionalized capturing agent with tetraethylorthosilicate (TEOS or $(EtO)_4Si$) in the presence of water and ethanol to condense the agent and the ceramic precursor together into a solid material, which step may be done in the presence of other ceramic precursors not including the chelating agent. Thus, Step 5 results in a solid recovery material according to one embodiment of the invention.

Figure 7:
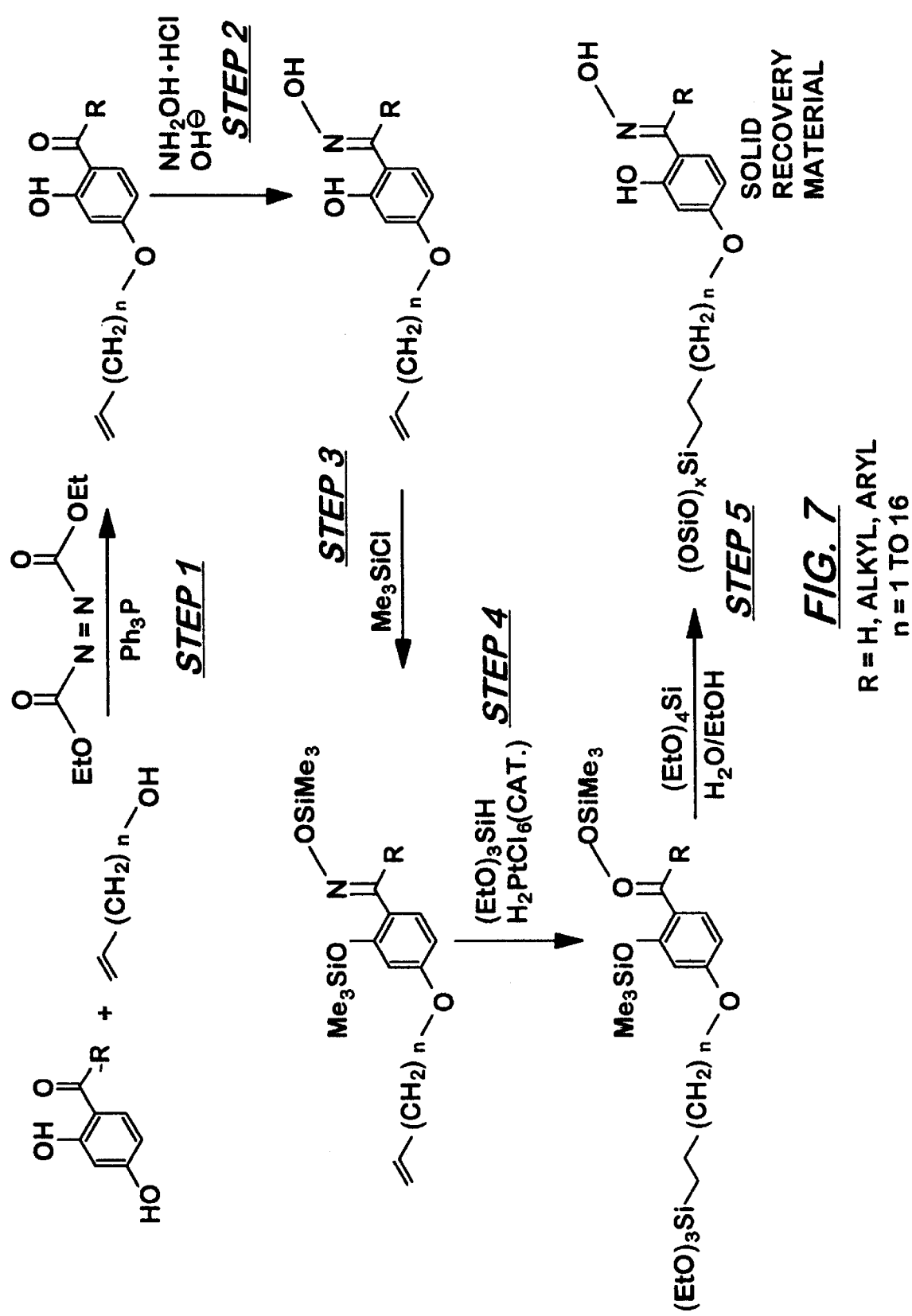
FIG. 7 is a schematic of an isoxazole, ether-addition method of making a solid recovery material according to the invention, in the class of methods of FIG. 2C.

FIG. 7 illustrates yet another "ether addition" synthesis, referred to as the "Isoxazole Route." In FIG. 7, Step 1 adds a carbon-carbon double bond tail by reacting 2,4-dihydroxybenzaldehyde with $CH_2CH(CH_2)_nOTs$ (for example, 1-undecylenyltosylate) in the presence of $KHCO_3$ and acetone (See also Step 1 of FIG. 6). Then, in Step 2, the product of Step 1 is reacted with hydroxylamine-O-sulfonic acid and sodium bicarbonate in ethanol and water, to form the "protected" benzisoxazole compound, for example, 5(1-undecylenyl)-1,2-benzisoxazole. Step 3 adds the silica-linking agent, $(EtO)_3Si$, in the presence of a platinum chloride catalyst, to obtain the functionalized capturing agent. Step 4 mixes the capturing agent with tetraethylorthosilicate (TEOS or $(EtO)_4Si$) in the presence of water and ethanol to condense the agent and the ceramic precursor together into a solid material, which step may be done with other types of ceramic precursors, including precursors without chelating agents, condensing to form ceramic material. Step 5 hydrates the benzisoxazole sites of the solid material to activate the oxime chelating sites, resulting in the in-situ condensed solid recovery material according to this embodiment of the invention. In this synthesis, as with many other embodiments of the solid recovery material, the condensation may take place with other types of ceramic precursors, including precursors not including chelating agents.

Figure 8:
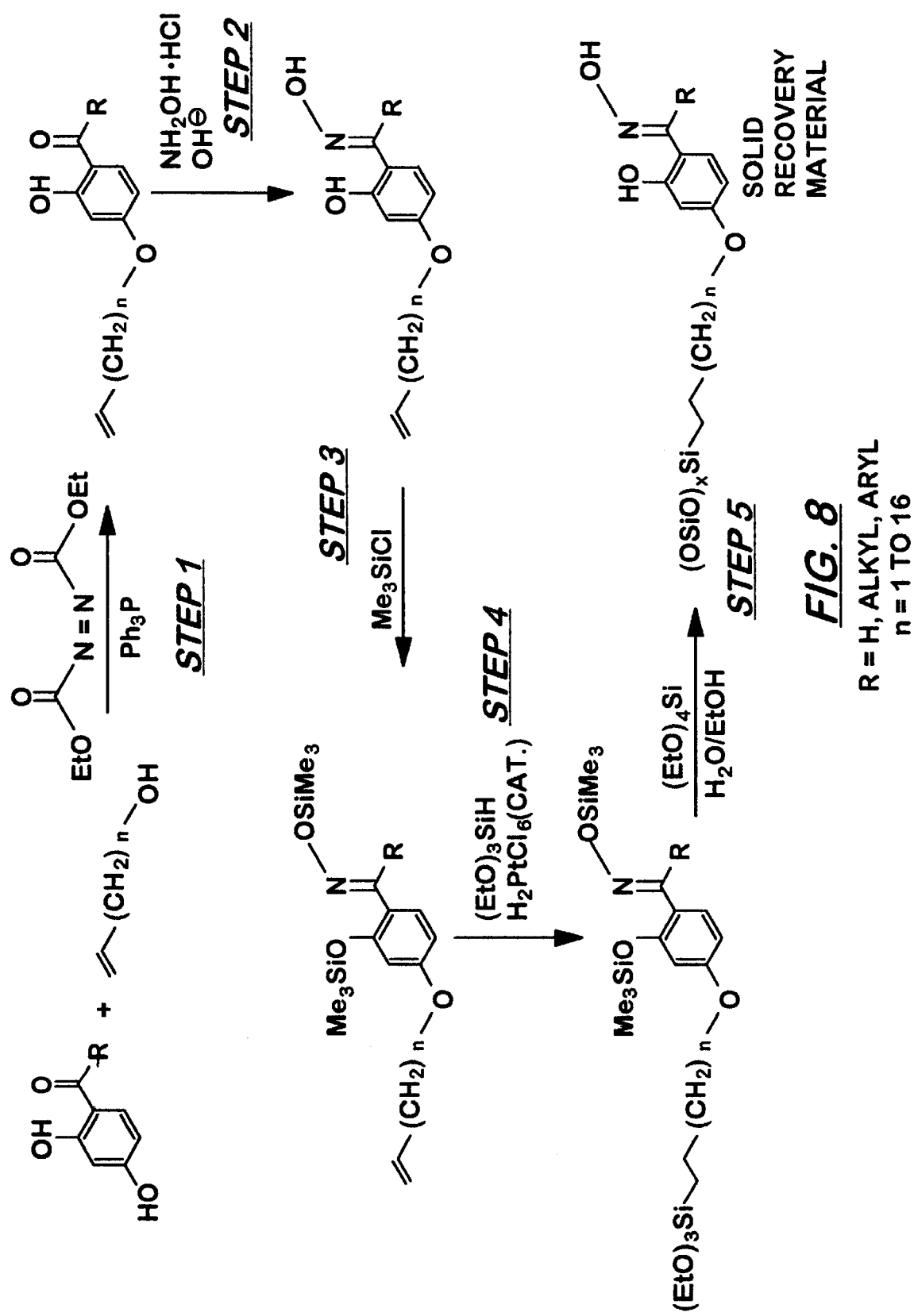
FIG. 8 is a schematic of a "Mitsunobu plus Oxime" method of making a solid recovery material according to the invention, in the class of methods of FIG. 3A.
Figure 9:
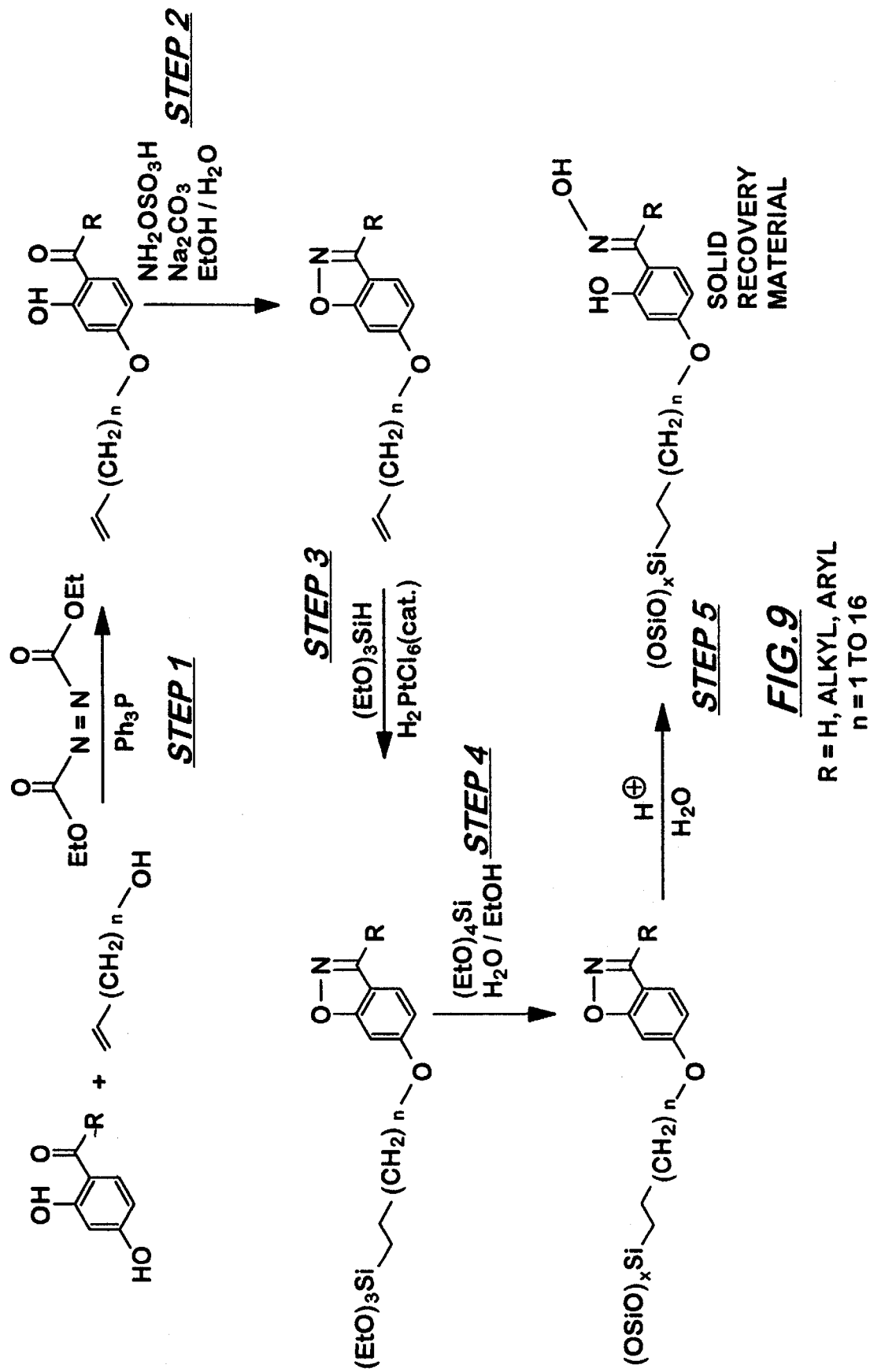
FIG. 9 is a schematic of a "Mitsunobu plus Isoxazole" method according to the invention, in the class of synthesis methods of FIG. 3B.
Figure 10:
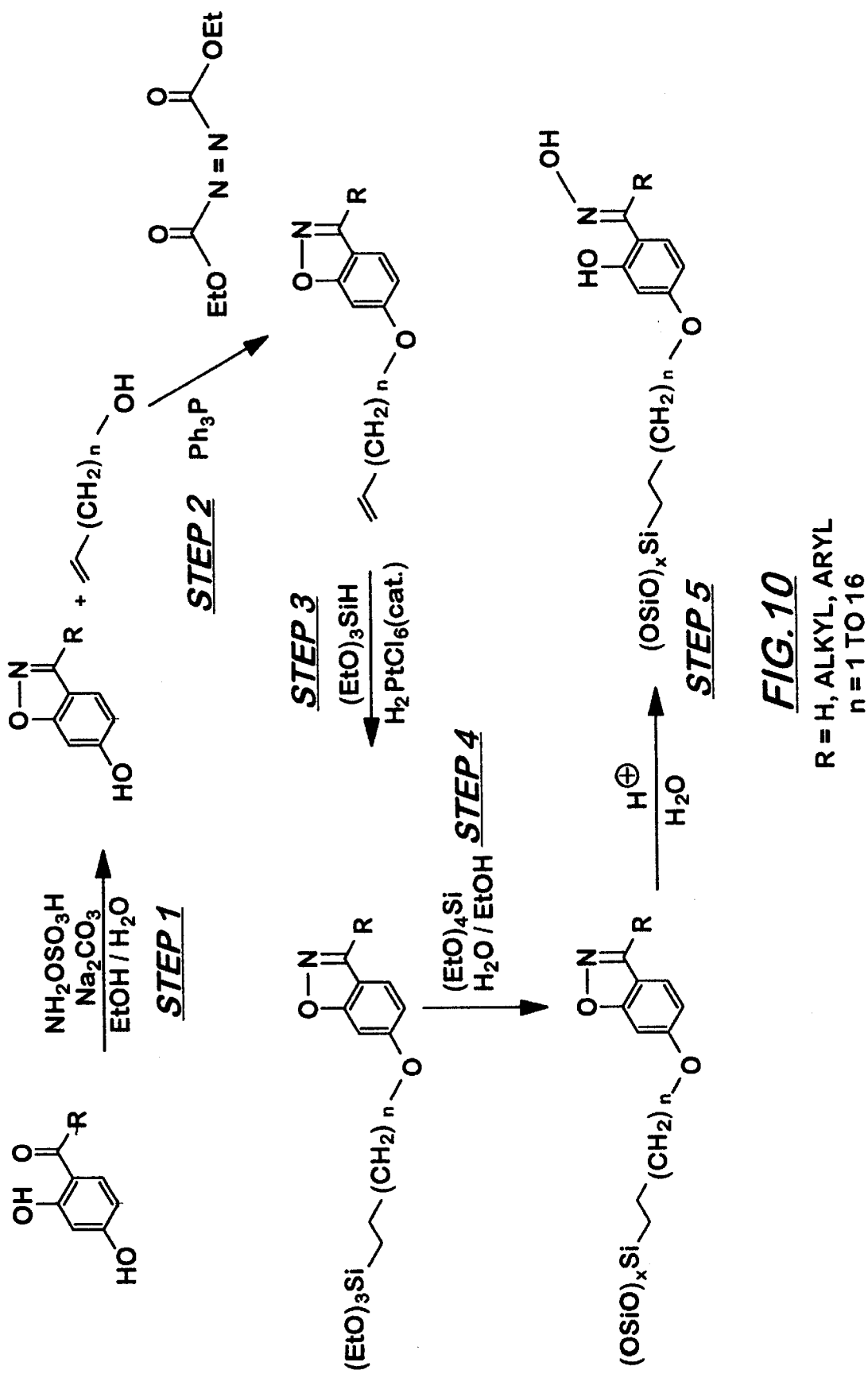
FIG. 10 is a schematic of a "Isoxazole plus Mitsunobu" method according to the invention, in the class of synthesis methods of FIG. 3B.

FIGS. 8–10 illustrate especially-preferred syntheses resulting in the invented recovery material, which are termed in general "Mitsunobu Routes." FIG. 8 illustrates a synthesis called the "Mitsunobu+Oxime Route." In FIG. 8, Step 1 reacts 2,4-dihydroxybenzaldehyde with $CH_2CH(CH_2)_nOH$ in the presence of diethyl azodicarboxylate ("DEAD") and $Ph_3P$ ("TPP"), to attach an alpha-olefin ether tail to the ring at the 4-position. Generally, the use of TPP and diethyl azodicarboxylate to form an ether linkage was discovered some years ago by Mitsunobu. Step 2 substitutes (:NOH) for the oxygen on the RC(:O) group, as in Step 2 of the FIG. 6 synthesis. Step 3 reacts the oxime with $R''_3SiCl$ to protect the oxime site during subsequent steps, wherein R" is methane in FIG. 8, but may be selected from alkyls, t-butyls, perfluoroalkyls, phenyl groups, and other groups. Step 4 attaches a silica linking agent, triethoxysilane, to form the functionalized capturing agent. Step 5 mixes the functionalized capturing agent with ceramic precursor tetraethylorthosilicate ("TEOS" or $(EtO)_4Si$), and optionally other types of precursors including those without chelating agents, in the presence of water and ethanol to condense the agent and the ceramic precursor together into a solid material. This condensation removes —$SiMe_3$ to activate the RC(:NOH) site, so that Step 5 results in a solid recovery material according to one embodiment of the invention.

FIG. 9 illustrates another Mitsunobu synthesis, the "Mitsunobu+Isoxazole Route." This is an especially-preferred efficient and convenient synthesis that has produced high yields of the solid metal ion recovery material. Step 1 attaches a tail with a carbon-carbon double bond to the 2,4-Dihydroxybenzaldehyde molecule in the presence of diethyl azodicarboxylate and $Ph_3P$. Step 2 forms the "protected" 5-(1-undecylenyl)-1,2-benzisoxazole compound by reaction with hydroxylamine-O-sulfonic acid and sodium bicarbonate in ethanol and water. Step 3 adds the silica-linking agent, $(EtO)_3Si$, in the presence of a platinum chloride catalyst, to obtain the functionalized capturing agent. Step 4 mixes the capturing agent with tetraethylorthosilicate (TEOS or $(EtO)_4Si$) in the presence of water and ethanol to condense the agent and the ceramic precursor, optionally with other precursors, together into a solid material. Step 5, which may take place in an acidic process environment, hydrates the benzisoxazole sites of the solid material to activate the oxime chelating sites.

FIG. 10 illustrates an alternative Mitsunobu synthesis, called the "Isoxazole+Mitsunobu Route," which uses generally the same steps as the synthesis in FIG. 9, except that the Mitsunobu and the Isoxazole steps are reversed. Step 1 forms a "protected" benzisoxazole compound (5-hydroxy- 1,2-Benzisoxazole) by reaction of the 2,4-Dihydroxybenzaldehyde with hydroxylamine-o-sulfonic and sodium bicarbonate in ethanol and water. Step 2 attaches a carbon-carbon double bond ether tail by reacting the benzisoxazole with $CH_2CH(CH_2)_nOH$ in the presence of diethyl azodicarboxylate and $Ph_3P$, for example, to obtain 5(1-undecylenyl)-1,2-benzisoxazole. Steps 3, 4 and 5 then proceed as in the synthesis of FIG. 9, to result in a solid recovery material according to one embodiment of the invention.

EXPERIMETAL DATA

The following laboratory procedures illustrate portions of the above syntheses, and techniques that may be used to produce embodiments of the invented solid recovery materials.

Oxime (3-ALLYL-2-HYDROXY-BENZALDOXIME) Synthesis A:

Reaction:

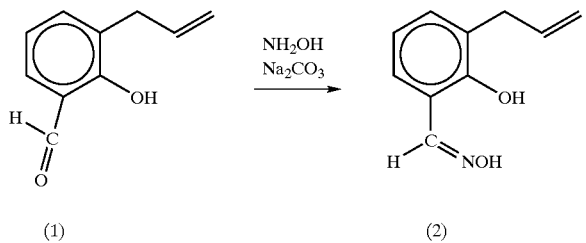

Materials

10% $Na_2Co_3$ solution (2 g $Na_2Co_3$, anhy/20 ml)
Ethanol, 95%
Hydroxylamine HCl
Glacial acetic acid
Product I above from previous synthesis (see FIG. 4, Step 1, for example) or commercially available

Procedure 1.3 g of Product I was dissolved in 5 ml of 95% EtOH in a stirred beaker. A solution of 1.0 g Hydroxylamine HCl in 5 ml DI H2O was added. The mixture was placed in an ice bath and stirred. 10% $Na_2CO_3$ solution was added drop-wise until the pH was about 8–9. In addition, approximately 4 ml EtOH was added to help the oily product dissolve. After 1 hour the ice bath was removed and the product stirred at room temperature about 16 hours. The solution was then acidified with glacial HOAc until the pH measured approximately 4–5. The solution was then poured into a 100 ml flask and the beaker rinsed with 20–30 ml EtOH. The EtOH was then removed on the rotary evaporator and the solution was allowed to cool. Yellowish crystals separated, and were extracted 2× with 50 ml each $CH_2Cl_2$, dried and solvent removed, transferred to beaker with $CH_2Cl_2$. $CH_2Cl_2$ was evaporated. Crystalline Product 2: 3-allyl-2-hydroxy-Benzaldoxime.

Isoxazole Synthesis B:

Reaction:

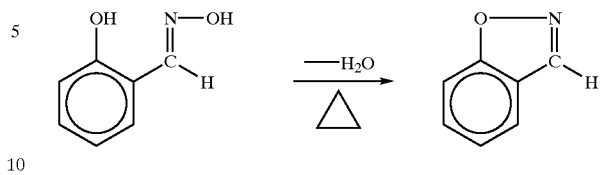

Procedure

Objective was to dehydrate benzaldoxime to isoxazole. Dehydration accomplished by heating and Rotavap™ rotary evaporating the oxime mother liquor from Synthesis A, above. Resulting material had melting point of 77–80° C. and NMR analysis showed benzisoxazole.

Synthesis C: Addition of Double Carbon-carbon Bond Tail to Isoxazole: "Silylation"

Reaction:

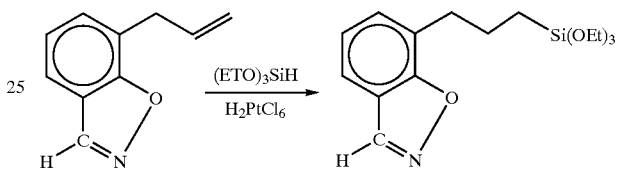

Materials

Triethoxysilane, 95%
Product from Synthesis B (comprising benzisoxazole), 203 grams
$H_2PtCl_6$ in dry i-PrOH, 2.5 ml of a 6.3% solution
Dry Schlenk tube and dry gas-tight syringe

Silylation Procedure 189 mg of $H_2PtCl_6$ was added to 3 ml of dry isopropanol, making a 6.3% catalyst solution. 165 mg of benzisoxazole product from Synthesis B was placed into the Schlenk tube under nitrogen, and then 1 ml of triethoxysilane was added, followed by 2.5 ml of the catalyst solution. The solution was mixed well and placed in an oil bath at 40° C. Three days later, the reaction mixture was analyzed by NMR, which indicated that all of the allyl group on the benzisoxazole had been silylated or reacted in some way.

Alternative Silylation Procedure

Catalyst, triethoxysilane, and the isoxazole-containing product from Synthesis C were mixed well under nitrogen in a Schlenk tube. The tube was placed in an oil bath at 60 C. for a total of about 96 hours, 159 mg of product from this procedure, 0.55 ml triethoxysilane, 2.5 ml isopropanol, and catalyst comprising 3 drops of 6.3% $H_2PtCl_6$ in i-PrOH were mixed in a dry Schlenk tube and placed in an oil bath at 40° C. for about 5 days. NMR of the resulting tube mixture showed almost no allyl compound remaining, showing successful silylation.

Synthesis D: Silica Gel Substituted Product

Procedure

Schlenk tube contents from Synthesis C were transferred to a flask and the i-PrOH was removed on a rotary evaporator. The residue was dissolved in 10 ml dry toluene. 1.04 g silica gel was added, and a reflux condenser was attached. The mixture was then heated with stirring to a gentle reflux for 1 hour and then stirred at room temperature overnight. The mixture was filtered by suction and washed well with toluene. The resulting slightly yellow solid was then dried at room temperature and then in an argon-flushed over at 60° C. overnight. This product was a solid material, comprising the isoxazole compound covalently attached to the silica gel.

Figure 11A:
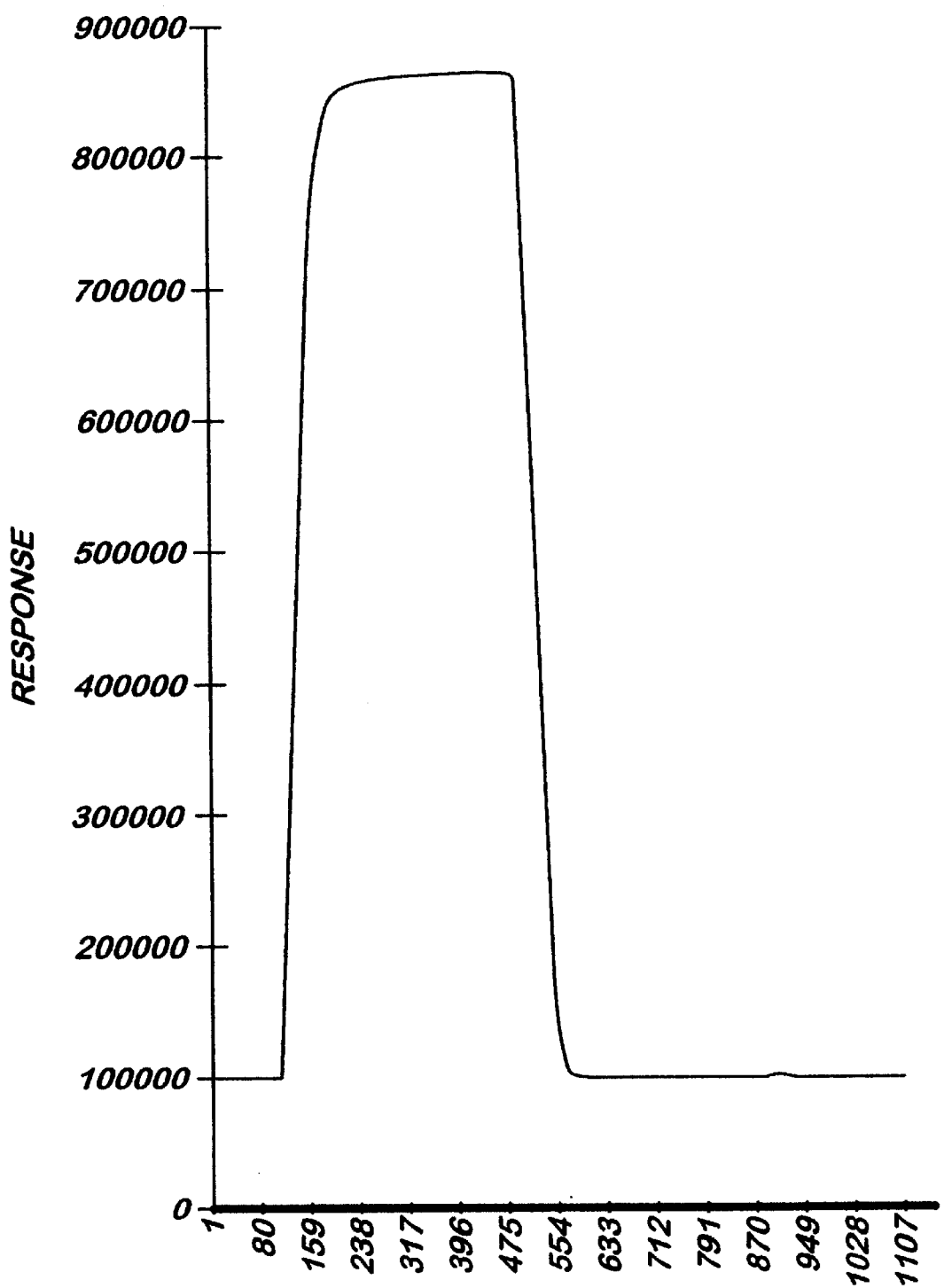
FIGS. 11A and 11B are copper capture/release chromatograms demonstrating the efficacy of one embodiment of the invented solid phase material, this example being specific for copper.
Figure 11B:
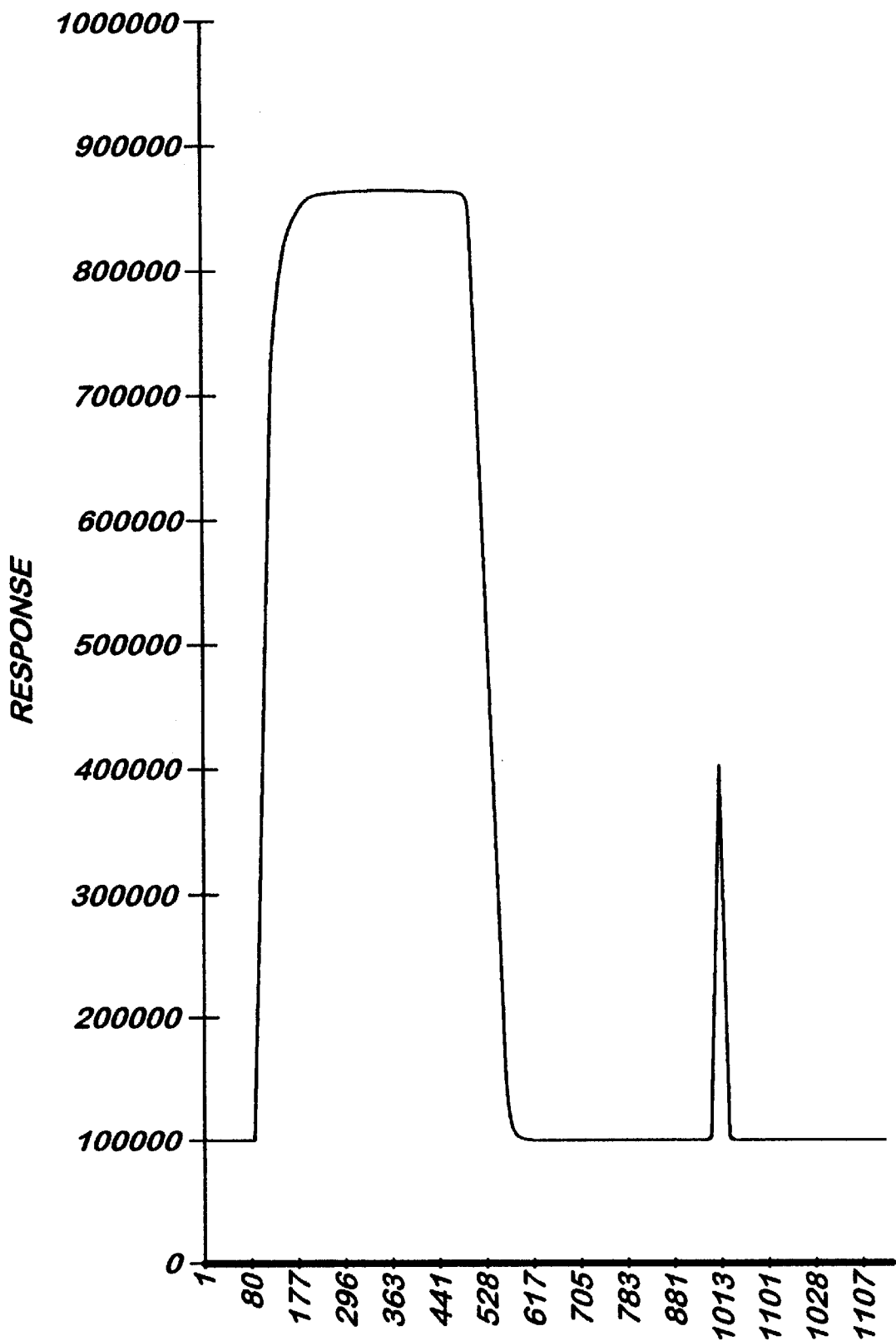

The isoxazole-silica gel product was then hydrated by passing a water-saturated air through it for about 24 hours, to transform the isoxazole-silica gel to a salicylaldoxime-type-silica gel solid. Testing for copper removal of this oxime head product with three-carbon tether was done by chromatogram technique, compared to an unmodified silica. After copper loading (FIGS. 11A and 11B, right peak), subsequent acid stripping was done. In the case of the oxime head connected to the solid, a left peak (FIG. 11B) was witnessed, corresponding to copper being stripped off of the solid.

Synthesis E: OF 5-HYDROXY-1,2-BENZISOXAZOLE

Reaction:

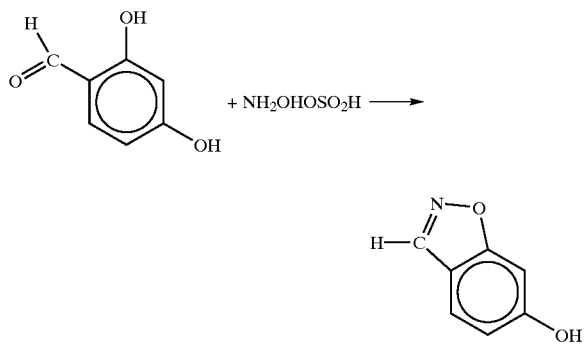

Materials:

| | |
|---|---|
| hydroxylamine-o-sulfonic acid, Aldrich | 15.84 g (140 mmole) |
| 2,4-Dihydroxybenzaldehyde, Aldrich | 16.56 g (120 mmole) |
| sodium sulfate, anyhydrous | 1.30 g |
| sodium bicarbonate | 21.72 g (260 mmole) |

Procedure

In a 400 ml beaker equipped with magnetic stir-bar were placed 15.84 g hydroxylamine-o-sulfonic acid, 1.3 g anhydrous sodium sulfate, and 120 ml D.I. $H_2O$. After the materials dissolved, 16.56 g 2,4-Dihydroxybenzaldehyde was added in portions. The mixture was stirred at room temperature for 40 minutes. The resulting orange solution was then cooled to 0 degrees Centigrade and stirred for 15 min. 21.72 g of $NaHCO_3$ was added in small portions over about 20 minutes. The slurry was then stirred at 0 degrees Centigrade for 30 minutes in an ice bath. Then, 40 ml $H_2O$ was added to the slurry and a pH of approximately 5.5 was measured. The mixture was then extracted with 4×75 ml $Et_2O$ (ether). The combined $Et_2O$ layers were extracted with 1×100 ml 5% HOAc and 1×100 ml $H_2O$. The ether layer was dried with anhydrous $MgSO_4$. The ether was filtered through fluted Fisher P8 paper and the ether removed on the rotary evaporator. The residue was transferred to a 600 ml beaker and recrystallized from 300 ml H2O. Resulting weight was 10.71 g (66.1% weight yield), with melting point 156–159.5 degree C. Several subsequent recrystallizations were done to purify: 1) recrystallization from approx. 300 ml $H_2O$ (hot filtered, using 0.25 g activated charcoal), resulting in a weight of 9.38 g of a product, with melting point 160–161.5 degrees and the product being still somewhat brown; and 2) recrystallization from 50/50 EtOH/$H_2O$, then again from $H_2O$, resulting in a product of weight=5.49 g, and melting point=160–161.5 degrees C., which is the 5-hydroxy-1,2-benzisoxazole.

Synthesis F: OF 5(1-UNDECYLENYL)-1,2-BENZISOXAOLE

Reaction:

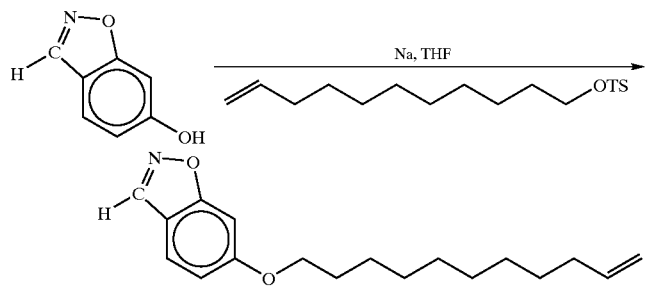

Materials:

| | |
|---|---|
| 5-hydroxy-1,2-benzisoxazole (product from above Synthesis E) | 1.00 g (7.41 mmole) |
| Sodium metal | 0.76 g (33 mmole) |
| THF, anhydrous | 25 ml |
| undecylenyltosylate | 2.35 g (7.26 mmole) |

Procedure

Oven-dried 50 ml 3 neck flask with stirring bar was flushed with nitrogen. 1.00 g 5-hydroxy-1,2-benzisoxazole was added, followed by 25 ml anhydrous THF. The resulting solution was stirred under $N_2$, heating was stopped, the sodium metal was added, and refluxed under $N_2$ overnight. The sodium metal was removed and washed with hexanes. Weighing the sodium showed that 11.30 mmole of the sodium metal reacted. The removed sodium metal was a light reddish-brown film on the surface. 2.35 g Undecyle-nyltosylate was injected with 10 ml THF into the solution and heated, with produced a reddish solution due to the presence of the resulting 5(1-undecylenyl)-1,2-benzisoxaole. This 5(1-undecylenyl)-1,2-benzisoxaole may be in-situ condensed with TEOS ceramic precursor, to create a solid "xerogel" having the metal-chelating characteristics desired.

Although this invention has been described above with reference to particular means, materials and embodiments, it is to be understood that the invention is not limited to these disclosed particulars, but extends instead to all equivalents within the scope of the following claims.

We claim:

1. A solid phase material for recovering copper ions from an aqueous stream in the presence of iron ions, the material comprising:
    a ceramic solid; and
    a chelating agent covalently bonded to the ceramic solid, wherein:
        the chelating agent comprises a chelating head and a tethering linker covalently bonded to said ceramic solid and to said chelating head;
        the chelating head comprises an oxime group adapted to capture and chelate a metal ion to the solid phase material; and
        the tethering linker comprises an ether moiety, and does not comprise nitrogen.

2. A solid phase material as in claim 1, wherein the tethering linker of the chelating agent is acid stable.

3. A solid phase material as in claim 1, wherein the tethering linker is a non-polymeric compound.

4. A solid phase material as in claim 1, wherein the chelating head comprises a salicylaldoxime molecule and oxygen of said ether moiety is covalently bound to a 6-carbon ring of said salicylaldoxime molecule.

5. A solid phase material as in claim 4, wherein the chelating head comprises a salicylaldoxime-type molecule.

6. A solid phase material as in claim 1, wherein the chelating head comprises 2-hydroxy benzophenone oxime.

7. A solid phase material as in claim 1, wherein the chelating head comprises 2-hydroxy acetophenone oxime.

8. A solid phase material as in claim 1, made by the method of providing a pre-formed ceramic solid followed by covalently binding of the chelating agent to the pre-formed ceramic solid.

9. A solid phase material as in claim 8, wherein the ceramic solid is a pre-formed glass or ceramic object.

10. A solid phase material as in claim 1, made by the method of forming said ceramic solid by in-situ condensation of ceramic precursors, some to all of which ceramic precursors have been covalently bound with the chelating agent.

11. A solid phase material as in claim 1, made by the method comprising:
    covalently binding a first end of an organic tail to the chelating head, the tail comprising a second end having a carbon-carbon double bond;
    connecting the tail second end to the ceramic solid by covalent bonding.

12. A solid phase material as in claim 11, further made by the method comprising dehydrating the oxime group to form an isoxazole group.

13. A solid phase material as in claim 11, made by the method further comprising protecting the chelating head prior to covalently binding the tail second end to the ceramic solid.

14. A solid phase material as in claim 13, made by the method further comprising de-protecting the chelating head after covalently binding the tail second end to the ceramic solid.

15. A solid phase material as in claim 14, wherein said de-protecting comprises hydrating an isoxazole group to form the oxime group.

16. A solid phase material as in claim 13, wherein said protecting comprises covalently bonding $R''_3$ SiCl to a nitrogen of an oxime group, wherein R" is alkyl, t-butyl, perfluoroalkyl, or phenyl.

* * * * *